(12) United States Patent
Yang et al.

(10) Patent No.: US 12,368,540 B2
(45) Date of Patent: Jul. 22, 2025

(54) UPLINK CONTROL INFORMATION (UCI) MULTIPLEXING FOR SEMI-PERSISTENT SCHEDULING (SPS) HYBRID AUTOMATIC REPEAT REQUEST (HARQ) SKIPPING

(71) Applicant: Apple Inc., Cupertino, CA (US)

(72) Inventors: Weidong Yang, San Diego, CA (US); Seyed Ali Akbar Fakoorian, San Diego, CA (US); Chunhai Yao, Beijing (CN); Yushu Zhang, Beijing (CN); Huaning Niu, San Jose, CA (US); Haitong Sun, Cupertino, CA (US); Hong He, San Jose, CA (US); Sigen Ye, Whitehouse Station, NJ (US); Wei Zeng, Saratoga, CA (US); Dawei Zhang, Saratoga, CA (US); Oghenekome Oteri, San Diego, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/995,545

(22) PCT Filed: May 10, 2021

(86) PCT No.: PCT/CN2021/092633
§ 371 (c)(1),
(2) Date: Oct. 5, 2022

(87) PCT Pub. No.: WO2022/236535
PCT Pub. Date: Nov. 17, 2022

(65) Prior Publication Data
US 2025/0007653 A1    Jan. 2, 2025

(51) Int. Cl.
*H04L 1/1829*    (2023.01)
*H04W 72/11*    (2023.01)
*H04W 72/21*    (2023.01)

(52) U.S. Cl.
CPC .......... *H04L 1/1861* (2013.01); *H04W 72/11* (2023.01); *H04W 72/21* (2023.01)

(58) Field of Classification Search
CPC ...... H04L 1/1861; H04W 72/21; H04W 72/11
See application file for complete search history.

(56) References Cited

U.S. PATENT DOCUMENTS

2021/0007088 A1*   1/2021   Zhou ................... H04W 72/044
2021/0051670 A1    2/2021   Fakoorian
(Continued)

FOREIGN PATENT DOCUMENTS

CN      111865506 A    10/2020

OTHER PUBLICATIONS

International Search Report received in PCT Application No. PCT/CN2021/092633, Feb. 10, 2022.
(Continued)

*Primary Examiner* — Brian D Nguyen
(74) *Attorney, Agent, or Firm* — Blank Rome LLP

(57) ABSTRACT

A method for wireless communications, including receiving first semi-persistent scheduling (SPS) information indicating a set of receiving occasions; receiving second SPS information for transmitting hybrid automatic repeat request (HARQ) information for the set of receiving occasions; determining SPS HARQ transmitting occasion based on the received second SPS information; monitoring for transmissions during one or more receiving occasions; determining HARQ feedback value for the one or more receiving occasions based on the monitoring; determining that the SPS HARQ transmitting occasion can be skipped based on the (Continued)

HARQ feedback value; identifying a first transmitting occasion for transmitting other information to the wireless node; determining that the SPS HARQ transmitting occasion overlaps the first transmitting occasion; determining SPS HARQ feedback information based on the determination that the that the SPS HARQ transmitting occasion overlaps the first transmitting occasion; and multiplexing the SPS HARQ feedback information and the other information.

20 Claims, 11 Drawing Sheets

(56) References Cited

U.S. PATENT DOCUMENTS

| | | | | |
|---|---|---|---|---|
| 2021/0068106 | A1 | 3/2021 | Damnjanovic | |
| 2024/0023081 | A1* | 1/2024 | Kumagai | H04W 72/11 |
| 2024/0032013 | A1* | 1/2024 | Kumagai | H04W 72/1273 |
| 2024/0032043 | A1* | 1/2024 | Gou | H04L 1/1614 |
| 2024/0187823 | A1* | 6/2024 | Shrivastava | H04W 76/28 |
| 2024/0276519 | A1* | 8/2024 | Lee | H04W 72/23 |

OTHER PUBLICATIONS

Nokia, et al., "Support for SPS periodicities below a slot," 3GPP TSG RAN WG1 Meeting #97 R1-1906758, May 3, 2019 (May 3, 2019).

* cited by examiner

UPLINK CONTROL INFORMATION (UCI) MULTIPLEXING FOR SEMI-PERSISTENT SCHEDULING (SPS) HYBRID AUTOMATIC REPEAT REQUEST (HARQ) SKIPPING

FIELD

The present application relates to wireless devices, and more particularly to apparatus, systems, and methods for performing semi-persistent scheduling (SPS) hybrid automatic repeat request (HARQ) skipping in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for receiving, by a wireless device, first semi-persistent scheduling (SPS) information indicating a set of receiving occasions, receiving, by the wireless device, second SPS information for transmitting hybrid automatic repeat request (HARQ) information for the set of receiving occasions, determining a SPS HARQ transmitting occasion based on the received second SPS information, monitoring for transmissions to the wireless device during one or more receiving occasions of the set of receiving occasions, determining a HARQ feedback value for the one or more receiving occasions based on the monitoring, determining that the SPS HARQ transmitting occasion can be skipped based on the HARQ feedback value, identifying a first transmitting occasion for transmitting other information to the wireless node, determining that the SPS HARQ transmitting occasion overlaps the first transmitting occasion, determining SPS HARQ feedback information based on the determination that the that the SPS HARQ transmitting occasion overlaps the first transmitting occasion, and multiplexing the SPS HARQ feedback information and the other information.

According to aspects of the present disclosure, a technique for wireless communications in a wireless system including a first wireless device comprising: a radio; and a processor operably coupled to the radio, wherein the processor is configured to: receive a first semi-persistent scheduling (SPS) information indicating a set of receiving occasions; receive, by the wireless device, second SPS information for transmitting hybrid automatic repeat request (HARQ) information for the set of receiving occasions; determine a SPS HARQ transmitting occasion based on the received second SPS information; monitor for transmissions to the wireless device during one or more receiving occasions of the set of receiving occasions; determine a HARQ feedback value for the one or more receiving occasions based on the monitoring; determine that the SPS HARQ transmitting occasion can be skipped based on the HARQ feedback value; identify a first transmitting occasion for transmitting other information to the wireless node; determine that the SPS HARQ transmitting occasion overlaps the first transmitting occasion; determine SPS HARQ feedback information based on the determination that the that the SPS HARQ transmitting occasion overlaps the first transmitting occasion; and multiplex the SPS HARQ feedback information and the other information.

Another aspect relates to a non-volatile computer-readable medium storing instruction that, when executed, caused a processor to: receive a first semi-persistent scheduling (SPS) information indicating a set of receiving occasions; receive, by the wireless device, second SPS information for transmitting hybrid automatic repeat request (HARQ) information for the set of receiving occasions; determine a SPS HARQ transmitting occasion based on the received second SPS information; monitor for transmissions to the wireless device during one or more receiving occasions of the set of receiving occasions; determine a HARQ feedback value for the one or more receiving occasions based on the monitoring; determine that the SPS HARQ transmitting occasion can be skipped based on the HARQ feedback value; identify a first transmitting occasion for transmitting other information to the wireless node; determine that the SPS HARQ transmitting occasion overlaps the first transmitting occasion; determine SPS HARQ feedback information based on the determination that the that the SPS HARQ transmitting occasion overlaps the first transmitting occasion; and multiplex the SPS HARQ feedback information and the other information.

The techniques described herein may be implemented in and/or used with a number of different types of devices, including but not limited to smartphones, cellular phones, tablet computers, portable computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which.

Figure 1:
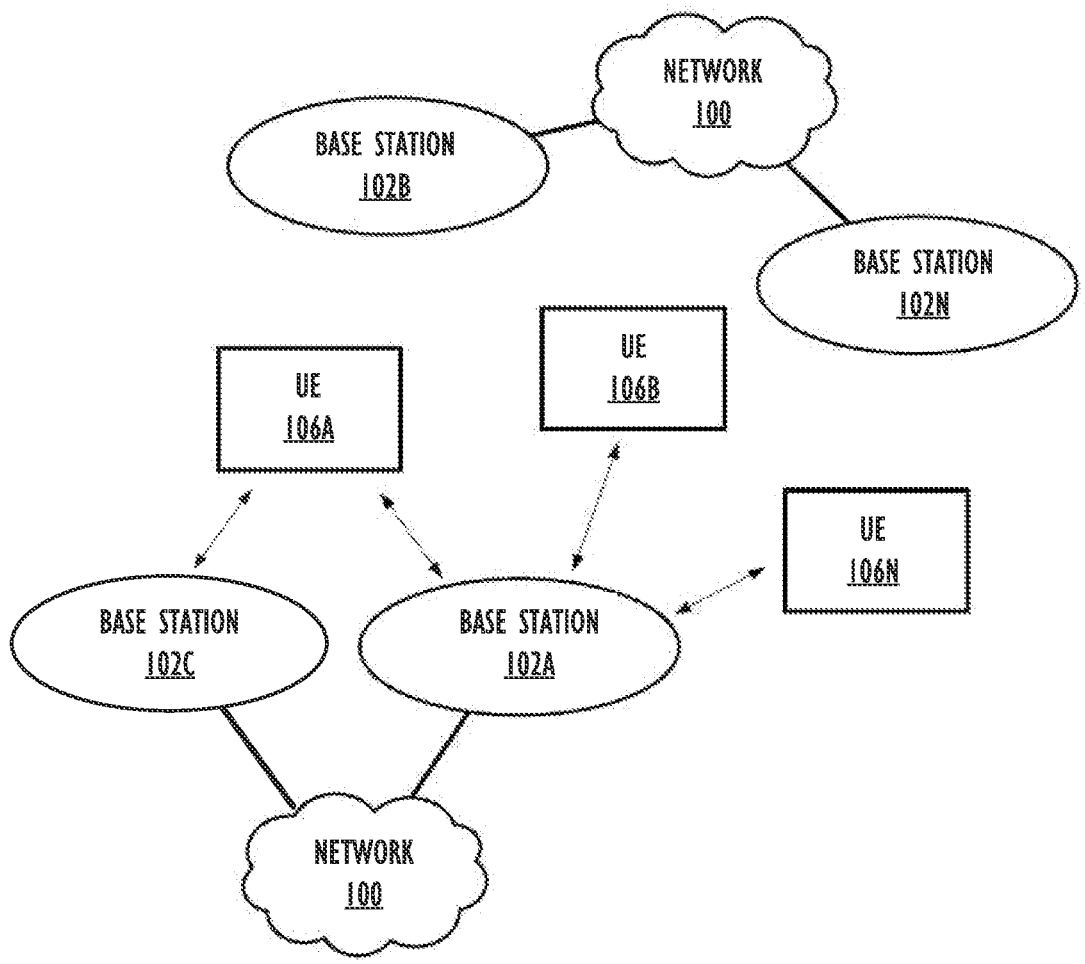
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications systems, a wireless device may be configured to provide feedback for every reception occasion. In some cases, feedback for each reception occasion is not needed and it may be beneficial to skip providing feedback for some reception occasions. In some cases, the feedback may be multiplexed with other transmissions. Skipping providing feedback may change how the multiplexing may be performed. Techniques for how to provide potentially skipped feedback multiplexed with other transmissions may be provided.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the term "UE" or "UE device" can be broadly defined to encompass any electronic, computing, and/or telecommunications device (or combination of devices) which is transportable by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some embodiments. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB." In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5GNR, HSPA, 3GPP2 CDMA2000 (e.g., 1×RTT, 1×EV-DO, HRPD, eHIRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
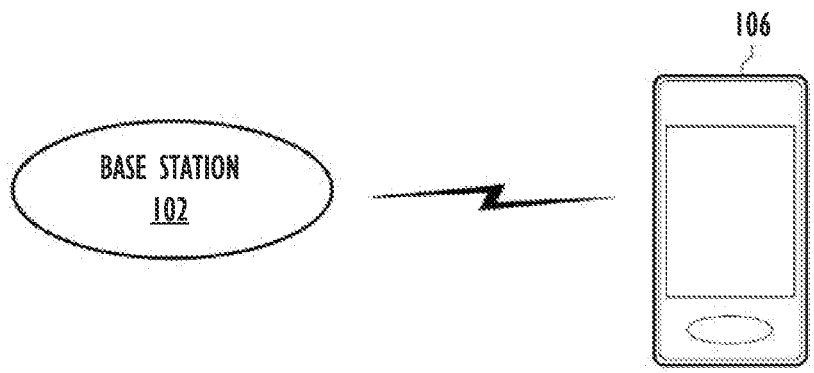
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHIRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Example Communication Device

Figure 3:
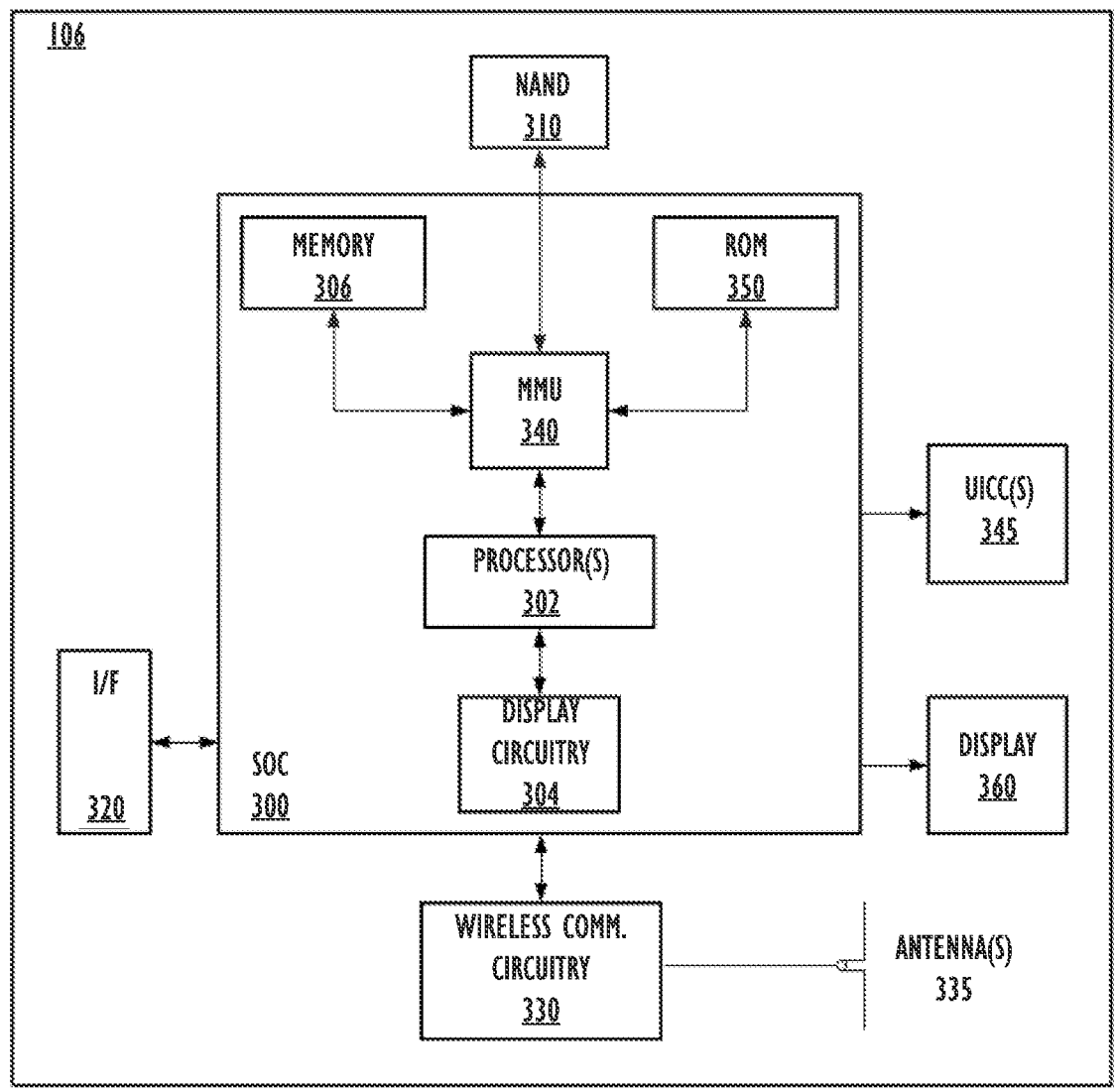
FIG. 3 illustrates an example block diagram of a UE, according to some Embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
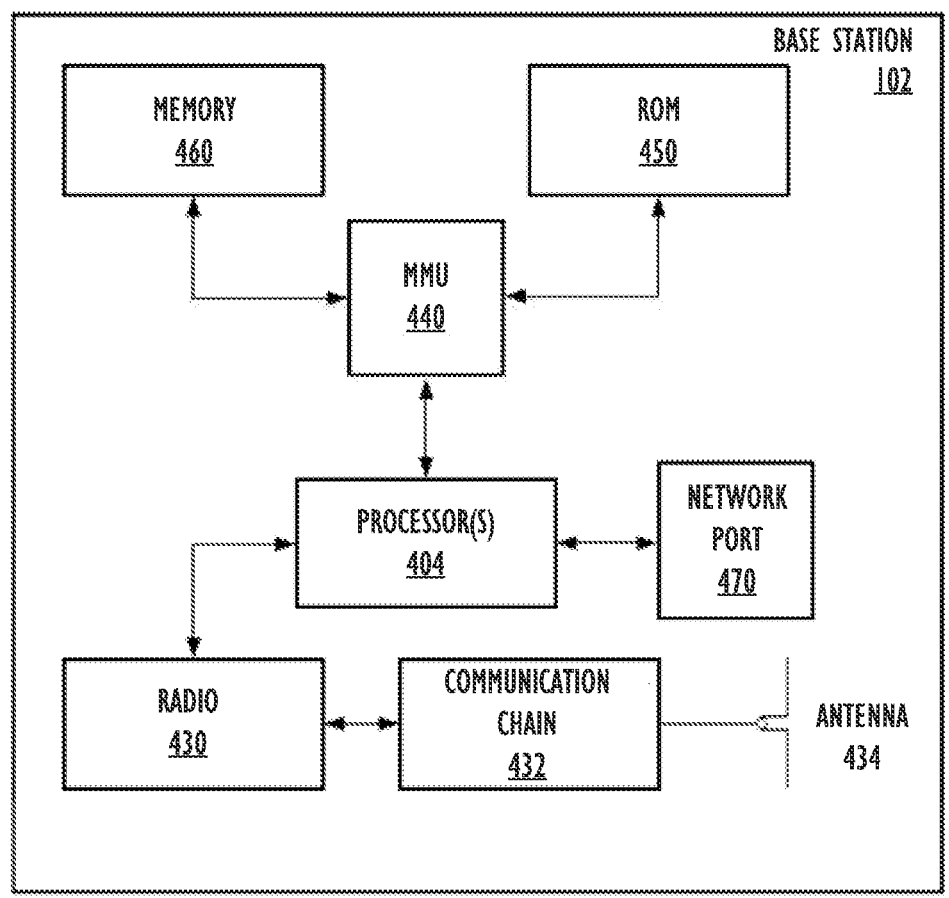
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB." In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
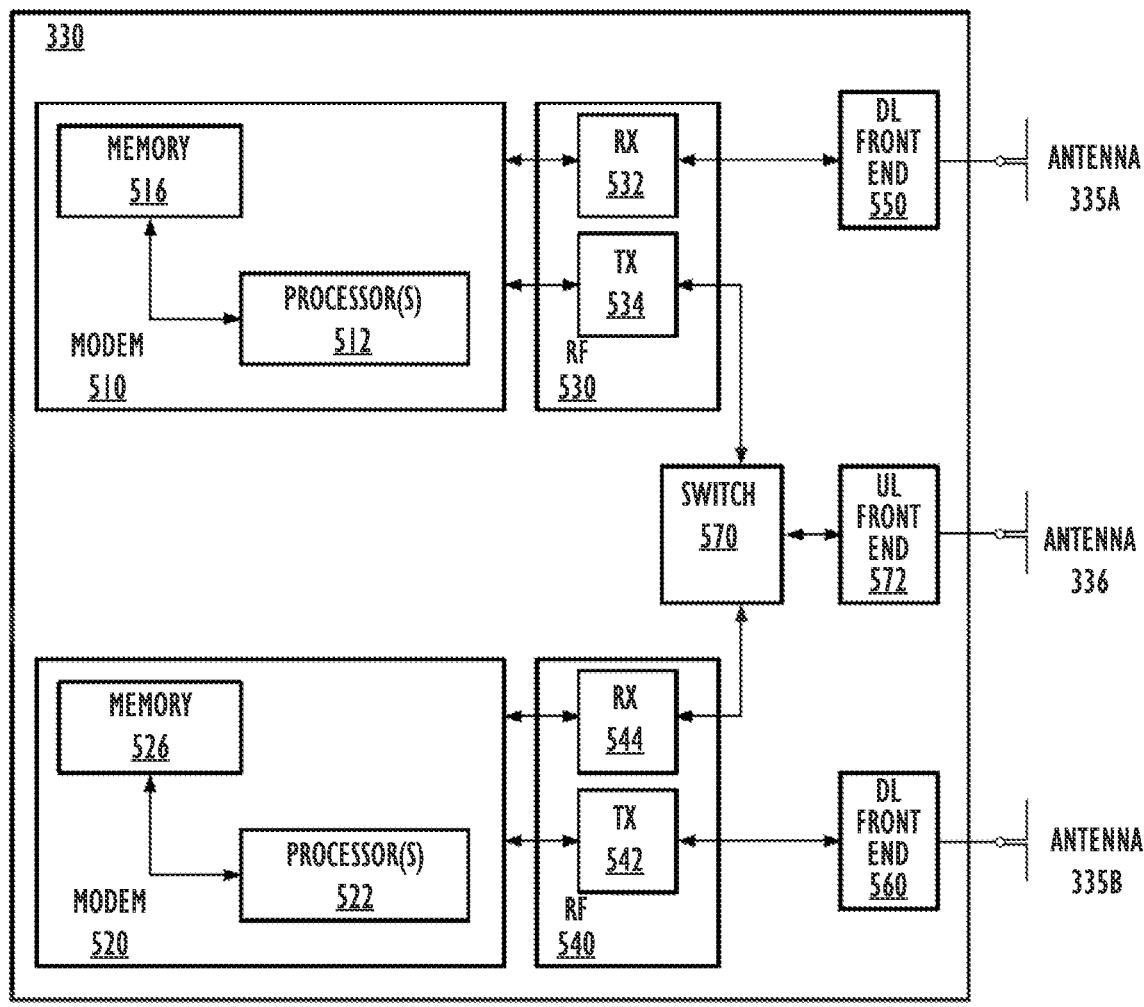
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Example Network Element

Figure 6:
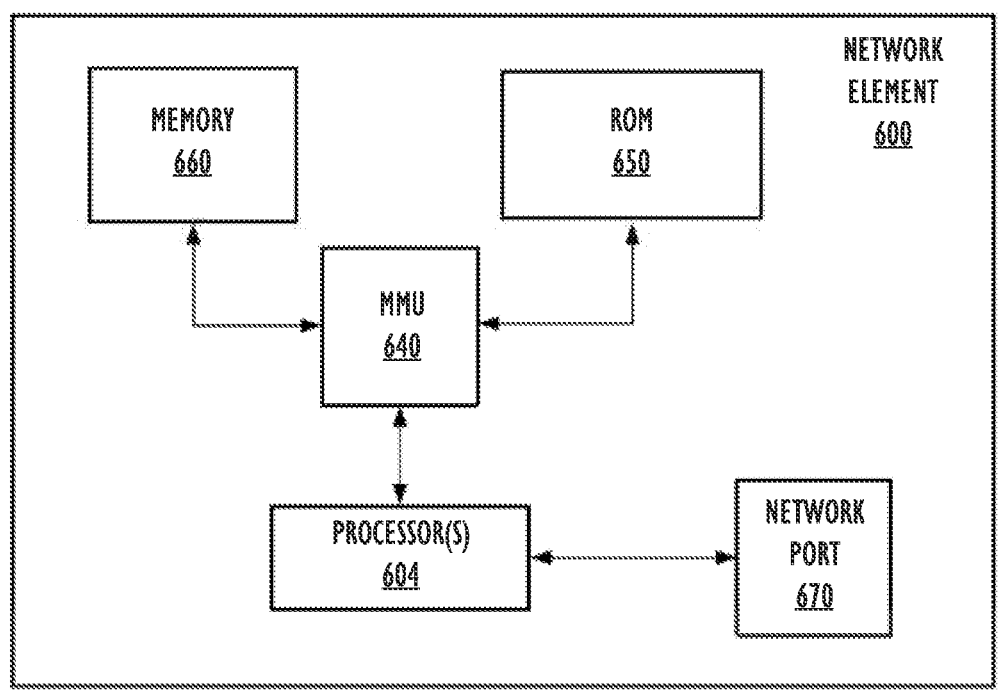
FIG. 6 illustrates an example block diagram of a network element, according to some embodiments.

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7A:
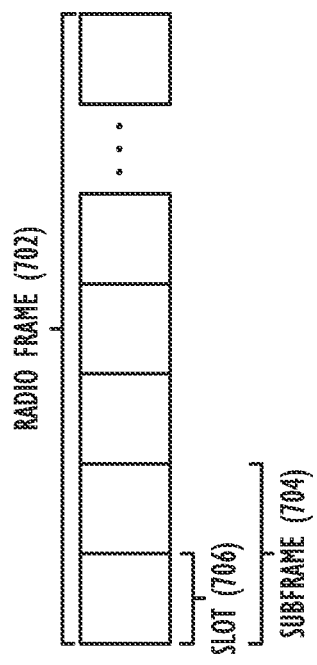
FIGS. 7A and 7B are diagrams illustrating radio frame structures, in accordance with aspects of the present disclosure.
Figure 7B:
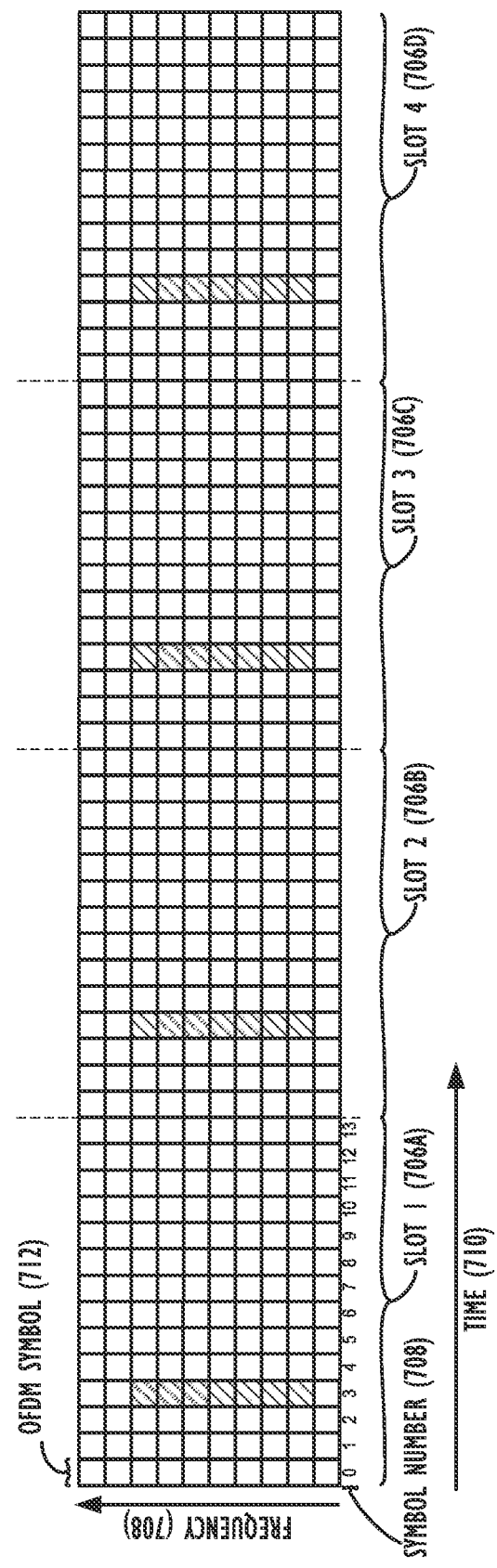

FIGS. 7A and 7B are diagrams illustrating radio frame structures, in accordance with aspects of the present disclosure. An example of a radio frame structure that may be used for wireless communications is shown in FIG. 7A. As shown, the radio frame structure of FIG. 7A includes a radio frame 702, which may be divided into subframes 704 and slots 706. The radio frame 702, subframes 704, and slots 706. may have a specified time duration. For example, in some wireless communications standards, such as 5G NR, the radio frame 702 may be have a defined duration of 10 ms and each slot 706 may be defined to have a duration of 0.5 ms. One or more adjacent slots 706 may be grouped into subframes 704. In this example, two slots are grouped into a subframe 704. In some cases, subframes 704 may include a combination of one or more of downlink control information, downlink data information, uplink control information and uplink data information. The combination of information types and direction may be selected independently for each subframe 704.

FIG. 7B is a diagram illustrating slot structures of a radio frame, in accordance with aspects of the present disclosure. In this example, slots 706A, 706B, 706C, and 706D are shown as a resource gird including a vertical axis 708 corresponding to a frequency domain and a horizontal axis 710 corresponding to a time domain. Each block in the resource grid represents a resource block (RB). Each column of RBs in the resource grid corresponds to a single orthogonal frequency division multiplexing (OFDM) symbol 712 in the time domain 710. The symbol index numbers 714 are also labeled across the horizontal time axis 710 for illustrative purposes. A slot (e.g., slot 1 706A) may include 14 OFDM symbols (712), and four slots (e.g., slot 1 706A, slot 2 706B, slot 3 706C, and slot 4 706D) are shown in this example. In certain cases, the NR system may be configured to use different numbers of symbols per slot (e.g., 12), if so desired.

Wireless systems, such as NR systems, may include separate control and data channels. For example, NR systems may include a physical uplink control channel (PUCCH) carrying uplink control information in a control region of a transmission. The data region may be allocated to a physical uplink shared channel (PUSCH) carrying user data. In the NR system, data can be transmitted from a gNB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). A demodulation reference signal (DMRS) is generally embedded in PUCCH, PUSCH, and PDSCH transmissions. The DMRS provides a phase reference used for demodulating data for these channels and for channel estimation and is therefore specific to each UE. In certain cases, DMRS design may be specific to each channel and may be configurable as needed. For example, a gNB may transmit via radio resource control (RRC), scheduling and configuration information for, among other channels, PUCCH, PUSCH, and PDSCH. This scheduling information may be semi-static and may define how and when to transmit or receive the PUCCH, PUSCH, and PDSCH for a period of time. As used herein, scheduling and scheduling information is intended to refer to planned transmission or reception occasions and information identifying such planned transmission/reception occasions. In some cases, scheduled transmission/reception occasions may be configured, but inactive until triggered (e.g., activated), such as via an RRC, MAC CE, or other control message. In other cases, a transmission may be scheduled by dynamic indication (e.g., reservation) prior to transmission.

In some cases, a channel may be scheduled to repeat across multiple slots according to a repetition pattern. In this example, a PUCCH 718 channel is configured to be repeated four times across slot 1 706A, slot 2 706B, slot 3 706C, and slot 4 706D. As shown each PUCCH repetition uses the same number of symbols and starts at the same starting symbol within each slot. A value, nrofSlots (e.g., nrofSlots=4) may indicate a total number of transmissions for the PUCCH 718. In current wireless networks, the value nrofSlots is a higher layer parameter, provided by a layer higher than the PHY layer, such as via network layer signaling such as RRC, and is semi-statically indicated.

In some cases, a UE may perform transmissions, retransmissions, and a hybrid automatic repeat request (HARQ) process. To perform these processes, the UE may communicate with and transmit data to nodes of a wireless network. For example, the UE may communicate with a node of the wireless network, such as, for example, an evolved NodeB (eNB) or Next Generation NodeB (gNB). A HARQ process may refer to an error-control method for data transmission that uses acknowledgements and timeouts to achieve reliable data transmission. An acknowledgement (ACK) may be a message sent by a receiver, such as, for example, a node, indicating that it has correctly received a packet and negative acknowledgement (NACK) may be a message indicating that the receiver either did not receive, or did not correctly receive a packet. A timeout may be a specified period of time allowed to elapse before an acknowledgement is to be received. If a UE transmitting a packet using a HARQ process does not receive an acknowledgement before the timeout, the UE may re-transmit the packet until the UE receives an acknowledgement and/or exceeds a predefined number of retransmissions. In some embodiments, the "hybrid" designation of a HARQ process may add an element of forward error correction (FEC).

Figure 8:
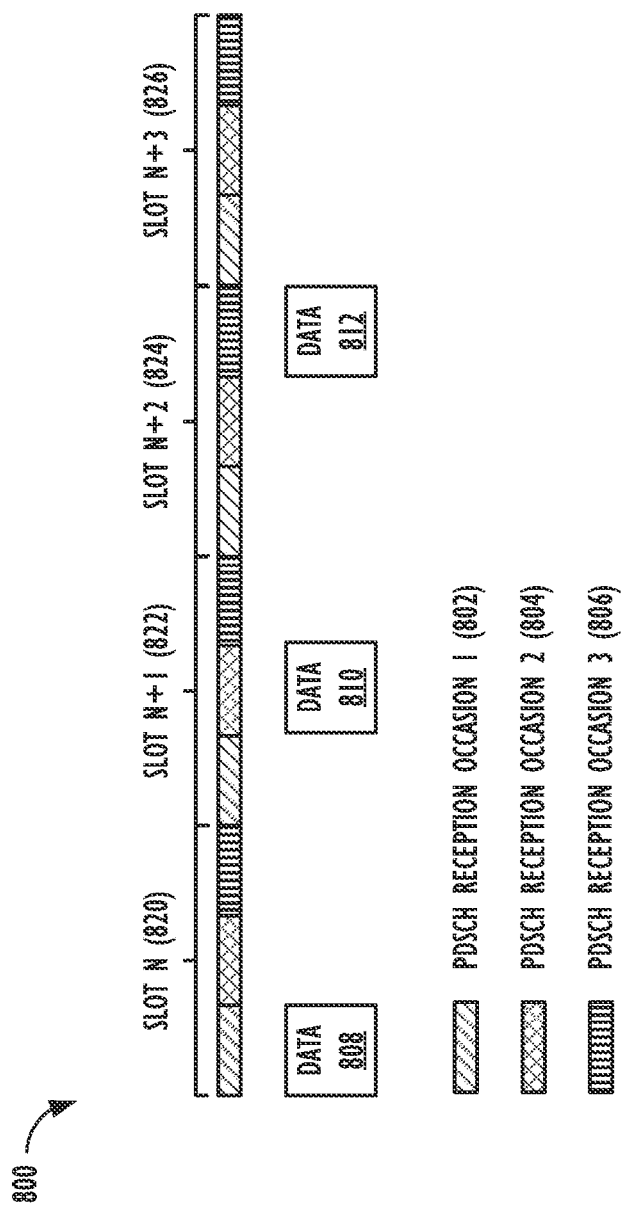
FIG. 8 is a diagram illustrating scheduled transmission occasions, in accordance with aspects of the present disclosure.

In some cases, the node may configure the UE to receive transmissions from the node to the UE at certain time instances. For example, the node may configure the UE to monitor for transmissions to the UE in multiple physical downlink shared channel (PDSCH) transmission occasions. FIG. 8 is a diagram illustrating scheduled transmission occasions 800, in accordance with aspects of the present disclosure. This example includes four slots, slots n 820, n+1 822, n+2 824, and n+3 826, where each slot includes three PDSCH receiving occasions. In some cases, periodic data may need to be transmitted to the UE that does not fit into a single PDSCH receiving occasion. For example, a 60 frame per second video may need data every 16.7 ms to render each frame. However, this timing may not directly map to a single PDSCH receiving occasion. Thus, the node may schedule multiple PDSCH receiving occasions for the UE to receive the data to render the video, for example using semi-persistent scheduling (SPS). In this example, the UE is scheduled to receive in all three PDSCH receiving occasions in a slot, PDSCH receiving occasion 1 802, PDSCH receiving occasion 2 804, and PDSCH receiving occasion 3 806. As shown, first data 808 may be received in PDSCH receiving occasion 1 802 of slot n 820, second data 810 may be received in PDSCH receiving occasion 2 804 of slot n+1 822, third data 812 may be received in PDSCH receiving occasion 3 806 of slot n+2 824, and no data may be received in slot n+3 826. Generally, HARQ feedback does not take into consideration why a receiving occasion, such as what the PDSCH receiving occasion is for; rather, HARQ feedback is provided for every receiving occasion. In this example, the node does not utilize all of the scheduled PDSCH receiving occasions to transmit data to the UE. However, the UE may still provide HARQ feedback (e.g., NACK) for the scheduled PDSCH receiving occasions including the non-utilized ones. In such cases, it may be advantageous for the UE to not send a HARQ feedback (e.g., NACK) for at least some of the PDSCH receiving occasions that are not utilized.

As another example, for some applications, such as industrial internet of things (IIoT), a relatively low block error rate (BLER), such as $10^{-6}$ ratio of a number of erroneous block over a number of total blocks received, may be expected. To help allow for such low BLER rates, the node may retransmit the data to the UE a relatively large number of times. Additionally, to measure the BLER, the node is primarily interested in the NACK responses indicating that a corresponding packet was either not received or received incorrectly, In such cases also, it may be advantageous for the UE to not send HARQ feedback (e.g., ACK) for at least some of these PDSCH receiving occasions in which data was successfully received.

In cases where a UE determines that it can skip providing HARQ feedback, the skipping should be performed in a way that helps reduce the impact of the skipped HARQ feedback on the node. For example, in some cases, not providing HARQ feedback when the HARQ feedback is scheduled may affect encoding or packet sizes. These alterations may cause the node to perform blind decoding on received packets and increase processing demands for the node.

In some cases, the SPS HARQ feedback may be configured with dedicated resources. For example, HARQ feedback may be configured in a slot such that the allocated HARQ PUCCH resource does not overlap with PUCCH resources allocated for other transmissions. In such cases, the UE may skip transmitting (e.g., does not transmit) the HARQ feedback corresponding with an expected result of a downlink reception occasion (e.g., skipping NACKs when no data is expected, and skipping ACKs when the node is more interested in NACKs, such as for BLER determinations). The node may perform blind detection on the PUCCH resource allocated for the HARQ feedback as the PUCCH resource allocated is known and a determination may be relatively easily made that the UE skipped transmitting the HARQ feedback. The node may then assume that an expected result of the downlink reception occasion occurred and that the HARQ feedback was skipped.

In some cases, the SPS HARQ feedback may be multiplexed with other uplink transmissions. FIG. 9A is a box diagram illustrating a slot 900 with PUCCH multiplexing, in accordance with aspects of the present disclosure. In this example, two PUCCH transmissions, a PUCCH for SPS HARQ 902 and a PUCCH for channel state information (CSI) 904 reporting, may be configured in slot 900. In some wireless systems, a SPS HARQ response may be multiplexed with certain other messages, such as a CSI report and scheduling request, and transmitted via an uplink control information (UCI) message on a PUCCH resource. When multiplexing the SPS HARQ feedback with another message, a payload size of the multiplexed message may be used to determine how the SPS HARQ feedback and other message are encoded and/or what resource to use to send the multiplexed message. However, skipping the SPS HARQ feedback may change the size of the multiplexed message and thus change how the message is encoded and/or what resource the multiplexed message is sent on. For example, a payload size of a configured SPS HARQ feedback may be n bits, but if the SPS HARQ feedback is skipped the payload size may then be 0, which changes the total payload size of the multiplexed message. As the node may not know whether SPS HARQ feedback will be skipped by the UE, the node may not be able to receive the message or may have to perform additional blind detection to receive the message. In the case where skipping the SPS HARQ feedback does not change the size of the message sufficiently, the receiving node may not know whether or which SPS HARQ feedback was skipped and may need to perform blind detection to determine whether the message includes skipped SPS HARQ feedback or does not include skipped SPS HARQ feedback. To help the node determine whether the UE has skipped SPS HARQ feedback, an indication of a size of the SPS HARQ feedback may be transmitted to the node.

Figure 9B:
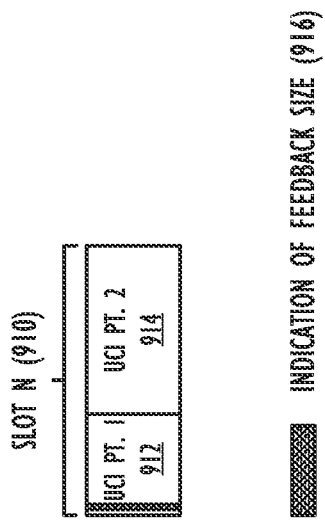
FIG. 9B is a box diagram illustrating a slot including a uplink control information (UCI) message, in accordance with aspects of the present disclosure.
Figure 9A:
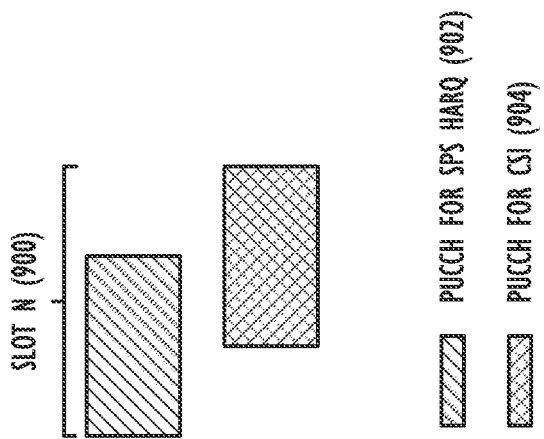
FIG. 9A is a box diagram illustrating a slot with PUCCH multiplexing, in accordance with aspects of the present disclosure.

FIG. 9B is a box diagram illustrating a slot 910 including a UCI message, in accordance with aspects of the present disclosure. Where a PUCCH with SPS HARQ feedback is configured to overlap with a PUCCH carrying another message, such as a CSI report or a scheduling request, the UCI message may be split into two parts, UCI part 1 912 and UCI part 2 914. An indication of a SPS HARQ feedback size 916 may be included in the UCI part 1 912. In some cases, the indication of the SPS HARQ feedback size 916 (e.g., indication of SPS HARQ feedback skipping) may be a single bit indicating whether the SPS HARQ feedback provided is a SPS HARQ codebook (e.g., normal, full size SPS HARQ feedback) or if SPS HARQ feedback has been skipped. The UCI part 2 914 may then contain either the SPS HARQ codebook, or no SPS HARQ feedback if the SPS HARQ feedback has been skipped. If SPS HARQ skipping is not applied, then the payload for the SPS HARQ feedback is determined based on the SPS configuration with HARQ enabled. If SPS HARQ skipping is used, the payload for SPS HARQ feedback may include one bit to indicate that SPS HARQ skipping is applied.

When multiple messages are multiplexed into a single UCI message the UCI may be split into multiple PUCCH resources. The UE may determine how to split the UCI into the multiple PUCCH resources and the last PUCCH resource may be known as a PUCCH resource Z. For a resource selection process of resource Z determination, the UE may assume that a single bit may be used for the SPS HARQ feedback if the SPS HARQ feedback skipping is to be used. If SPS HARQ feedback skipping is not used, then the full HARQ codebook size may be used. In some cases, additional indicators may be embedded in the PUCCH resource Z to indicate, for example, a SPS HARQ feedback payload size, SPS HARQ feedback type, and a location of the SPS HARQ feedback. In some cases, an indicator channel may be used to point to a PUCCH resource that is selected for use by the multiplexed messages. The indicator channel may include two bits to indicate which PUCCH resource, of the multiplexed PUCCH messages, to use, or the bits may indicate a particular modification to the PUCCH resources to use. For example, the indicator channel may contain two bits (e.g., [00], [01], [10], [11]), to point the PUCCH-1/2/3/4 or as a modification to the PUCCH resource.

In some cases, the UE may be configured to utilize SPS HARQ feedback deferral. As an example, SPS HARQ feedback deferral may be utilized when a SPS HARQ feedback may collide with a downlink symbol. When SPS HARQ feedback is deferred, a next occasion in which the deferred SPS HARQ feedback can be transmitted may be determined and the SPS HARQ feedback may be transmitted at the next occasion. In some cases, SPS HARQ feedback skipping may be configured along with SPS HARQ feedback deferral. For example, the deferred SPS HARQ feedback may be skipped. Where a deferred SPS HARQ feedback is multiplexed with another message, a two-part UCI message may used to carry the deferred multiplexed messages. Skipping the deferred SPS HARQ feedback may be performed substantially similarly as described above, with an indication of the SPS HARQ feedback size of the deferred SPS HARQ feedback provided in UCI part 1, and either the full HARQ codebook for the deferred SPS HARQ feedback or no SPS HARQ provided in UCI part 2.

In some cases, it may be desired to avoid adding an indication into the first part of a UCI message and placing SPS HARQ feedback information into the second part of the UCI message to support SPS HARQ skipping as doing so requires using two-part UCI feedback. In some cases, if there is an overlap between a PUCCH resources configured for SPS HARQ feedback and another channel, such as another configured PUCCH or PUSCH resource, then the SPS HARQ feedback may not be skipped and the full size HARQ codebook is used, even if the SPS HARQ feedback would otherwise meet criteria for skipping. For example, if a PUCCH for the SPS HARQ feedback overlaps with a PUCCH carrying a scheduling request and/or CSI report, then the full size of the HARQ codebook may be used (e.g., the SPS HARQ feedback is not skipped). In another example, if a PUCCH Resource Z, including SPS HARQ feedback, overlaps with a PUSCH, then the full size of the HARQ codebook may be used. Similarly, if SPS HARQ feedback skipping may be configured along with SPS HARQ feedback deferral and the deferred SPS HARQ feedback overlaps with another PUCCH message and may be multiplexed, then the full size of the HARQ codebook for the deferred SPS HARQ feedback may be used. If PUCCH resource Z includes a SPS HARQ codebook and overlaps with a PUSCH, then the full size of the HARQ codebook is used. In some cases, the full size HARQ codebook may be multiplex into a one part UCI feedback.

Figure 10A:
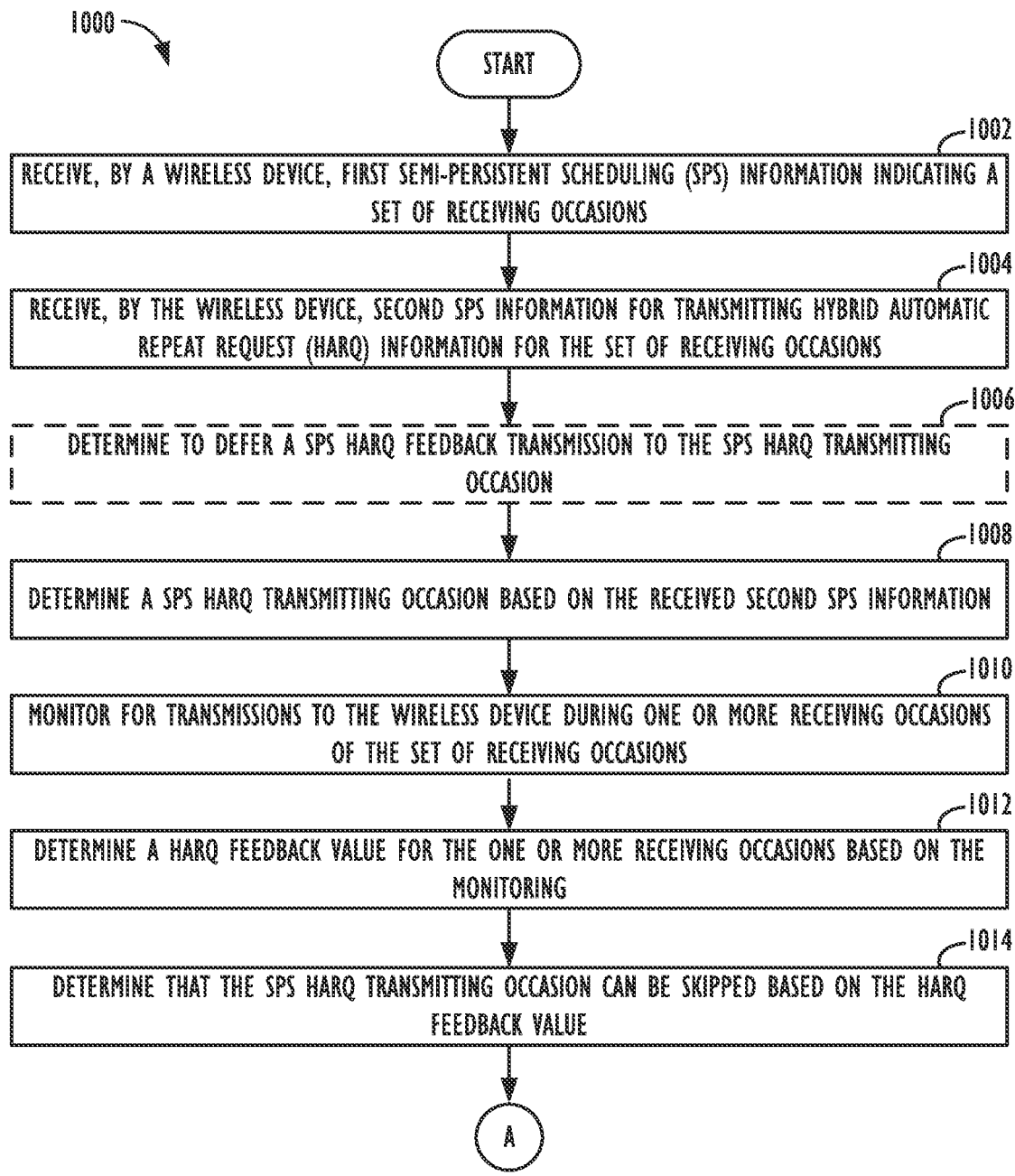
FIGS. 10A and 10B are a flow diagram illustrating a technique for wireless communications, in accordance with aspects of the present disclosure.
Figure 10B:
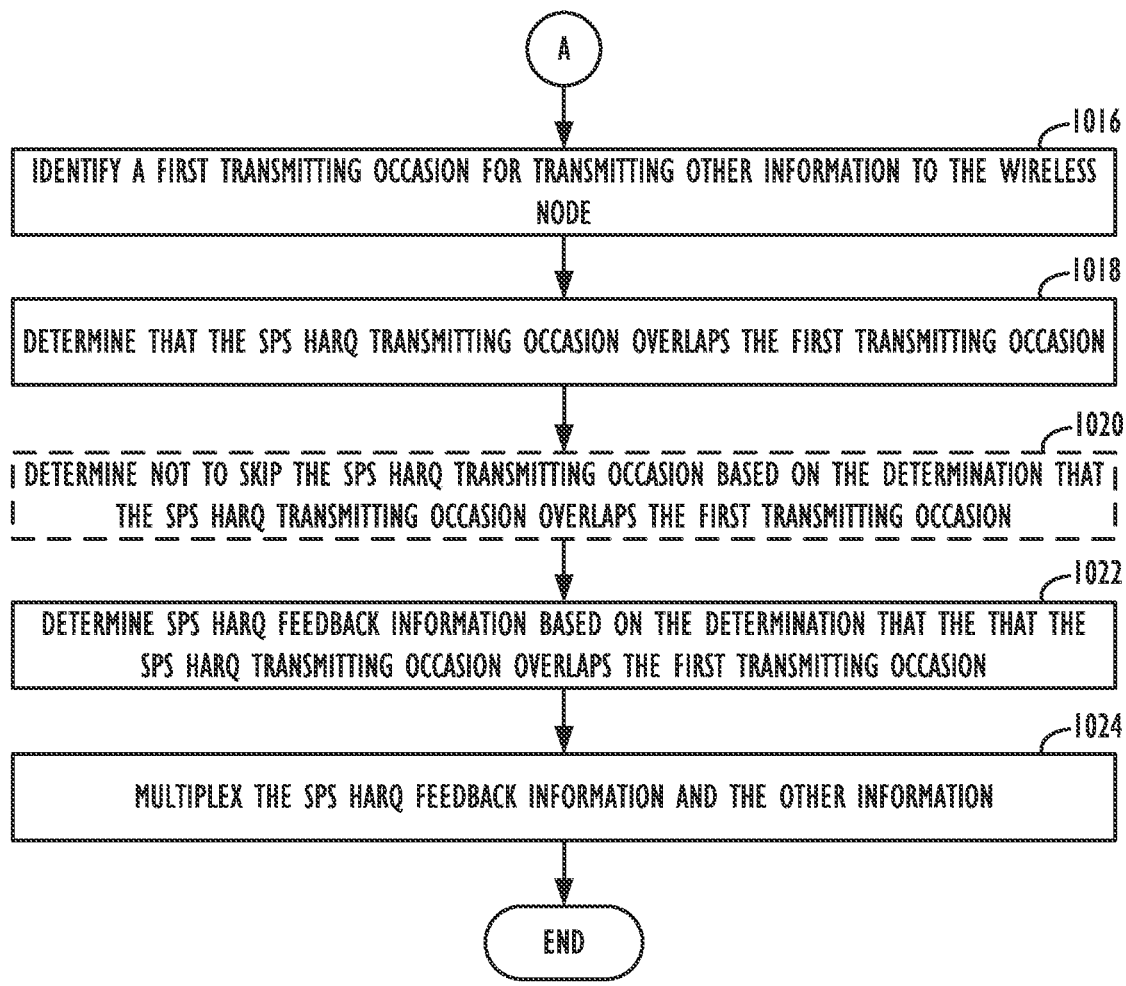

FIGS. 10A and 10B are a flow diagram 1000 illustrating a technique for wireless communications, in accordance with aspects of the present disclosure. At block 1002, a wireless device receives a first semi-persistent scheduling (SPS) information indicating a set of receiving occasions. For example, a wireless device may receive an SPS message configuring a periodic receiving occasion, such as PDSCH receiving occasions. At block 1004, the wireless device receives second SPS information for transmitting hybrid automatic repeat request (HARQ) information for the set of receiving occasions. For example, the wireless device may receive another SPS message configuring a periodic occasion for transmitting HARQ feedback for the periodic receiving occasion. In some cases, the first SPS information and second SPS information may be received in the same message or receiving occasion. For example, a single message may provide information about both receiving occasion(s) and HARQ feedback information, including feedback occasion information, along with RRC configuration information, such as in an activation DCI. In some cases, the HARQ feedback information may include two parts, the first part may be from RRC configuration information about PUCCH resources for SPS HARQ feedback. In some cases, the RRC configuration information may include multiple PUCCH resources for SPS HARQ feedback for different HARQ feedback sizes. The second part may include feedback timing information derived from an activation DCI sent by a wireless node to a wireless device.

Optionally, at block 1006, a determination to defer a SPS HARQ feedback transmission to the SPS HARQ transmitting occasion may be made. For example, the wireless device may determine SPS HARQ feedback for another PDSCH receiving occasion and then determine to defer transmitting the SPS HARQ feedback to a later HARQ transmitting occasion, for example, due to another scheduled transmission/reception during the earlier HARQ transmitting occasion.

At block 1008, a SPS HARQ transmitting occasion is determined based on the received second SPS information. For example, the wireless device may determine when to transmit the HARQ feedback based on the receive SPS message configuring a periodic occasion for transmitting HARQ feedback. At block 1010, transmissions to the wireless device are monitored during one or more receiving occasions of the set of receiving occasions. For example, the wireless device may attempt to receive PDSCH messages transmitted to the wireless device during a PDSCH receiving occasion. At block 1012, a HARQ feedback value is determined for the one or more receiving occasions based on the monitoring. For example, one or more HARQ feedback values may be determined based on whether the wireless device received a PDSCH message during the PDSCH receiving occasion. At block 1014, a determination that the SPS HARQ transmitting occasion can be skipped based on the HARQ feedback value is made. For example, for certain configurations, if all HARQ feedback bits in an SPS HARQ feedback codebook are NACK, then the wireless device may determine to drop the SPS HARQ feedback transmission.

At block 1016, a first transmitting occasion for transmitting other information to the wireless node is identified. For example, the wireless device may determine to transmit another information. In some cases, this other information may comprise a physical uplink shared channel (PUSCH), PUCCH carrying HARQ feedback, scheduling request, or channel state information (CSI) message. In some cases, the wireless device may identify that the wireless device is to transmit the other information based on a configured grant from, for example a wireless node, a configured periodic transmission, semi-persistent transmission, or dynamically indicated transmission. At block 1018, a determination that the SPS HARQ transmitting occasion overlaps the first transmitting occasion is made. For example, the wireless node may determine that the SPS HARQ transmission and the other transmission overlap in time, slot, or other transmission resource. In some cases, the first transmitting occasion is identified based on transmitting occasion information received from the wireless node.

Optionally, at block 1020, the wireless device may determine not to skip the SPS HARQ transmitting occasion based on the determination that the SPS HARQ transmitting occasion overlaps the first transmitting occasion. For example, the wireless device may be configured not to perform SPS HARQ feedback skipping when the SPS HARQ feedback transmission occasion overlaps another transmitting occasion.

At block 1022, SPS HARQ feedback information is determined based on the determination that the that the SPS HARQ transmitting occasion overlaps the first transmitting occasion. For example, where the wireless device is configured to perform SPS HARQ feedback skipping when the SPS HARQ transmitting occasion overlaps another transmitting occasion, the wireless device may prepare SPS HARQ feedback information consistent with the skipping. As another example, the wireless device may be configured not to perform SPS HARQ feedback skipping when the SPS HARQ transmitting occasion overlaps another transmitting occasion and the wireless device may prepare SPS HARQ feedback information consistent with not skipping. At block 1024, the SPS HARQ feedback information is multiplexed with the other information. In some cases, SPS HARQ feedback information may be multiplexed into a UCI message with the other information. This UCI message may include two parts. In some cases, the SPS HARQ feedback information may include an indication of a HARQ feedback size (or an indication about the presence of HARQ feedback), and the indication of the HARQ feedback size (or an indication of the presence of HARQ feedback) may be included in a first part of the UCI message. In some cases, the HARQ feedback size indicates that HARQ feedback is being skipped and a second part of the UCI message does not include HARQ feedback information. In some cases, the HARQ feedback size indicates that SPS HARQ feedback is being provided and a second part of the UCI message includes at least a portion of the HARQ feedback information. In some cases, the HARQ feedback may be multiplexed with the other information into a single part UCI message.

Figure 11:
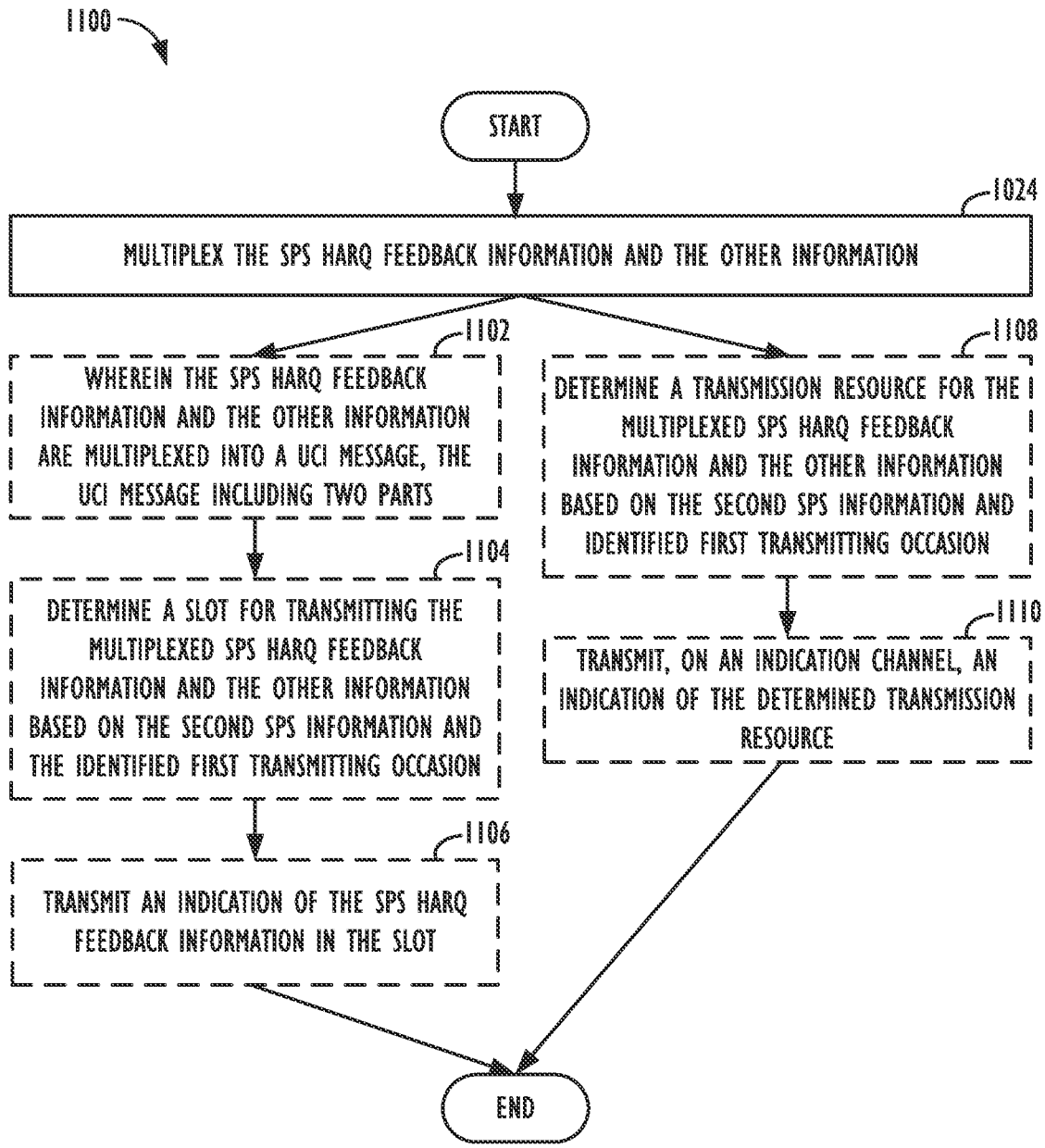
FIG. 11 is a flow diagram illustrating optional aspects of a technique for wireless communications, in accordance with aspects of the present disclosure.

FIG. 11 is a flow diagram 1100 illustrating optional aspects of a technique for wireless communications, in accordance with aspects of the present disclosure. Flow diagram 1100 extends the flow diagram 1000 of FIG. 10 and illustrates optional aspects of the present disclosure. At block 1024, the SPS HARQ feedback information is multiplexed with the other information. Optionally, at block 1102, the SPS HARQ feedback information and the other information are multiplexed into an uplink control information (UCI) message, the UCI message including two parts. Optionally, at block 1104, a slot for transmitting the multiplexed SPS HARQ feedback information and the other information is determined based on the second SPS information and the identified first transmitting occasion. For example, an indicator may be embedded into the PUCCH resource Z to indicate aspects about the SPS HARQ feedback. At block 1106 an indication of the SPS HARQ feedback information may be transmitted in the slot. At block 1108, a transmission resource for the multiplexed SPS HARQ feedback information and the other information may be determined based on the second SPS information and identified first transmitting occasion. For example, an indicator channel may be determined. The indicator channel may be used to point to a PUCCH resource that is selected for use by the multiplexed messages. At block 1110, an indication of the determined transmission resource may be transmitted on an indication channel.

EXAMPLES

In the following sections, further exemplary embodiments are provided.

According to Example 1, a method for wireless communications, the method comprising: receiving, by a wireless device, first semi-persistent scheduling (SPS) information indicating a set of receiving occasions; receiving, by the wireless device, second SPS information for transmitting hybrid automatic repeat request (HARQ) information for the set of receiving occasions; determining a SPS HARQ transmitting occasion based on the received second SPS information; monitoring for transmissions to the wireless device during one or more receiving occasions of the set of receiving occasions; determining a HARQ feedback value for the one or more receiving occasions based on the monitoring; determining that the SPS HARQ transmitting occasion can be skipped based on the HARQ feedback value; identifying a first transmitting occasion for transmitting other information to the wireless node; determining that the SPS HARQ transmitting occasion overlaps the first transmitting occasion; determining SPS HARQ feedback information based on the determination that the that the SPS HARQ transmitting occasion overlaps the first transmitting occasion; and multiplexing the SPS HARQ feedback information and the other information.

Example 2 comprises the subject matter of example 1, wherein the SPS HARQ feedback information and the other information are multiplexed into an uplink control information (UCI) message, the UCI message including two parts.

Example 3 comprises the subject matter of example 2, wherein the SPS HARQ feedback information includes an indication of a HARQ feedback size, and wherein the indication of the HARQ feedback size is included in a first part of the UCI message.

Example 4 comprises the subject matter of example 3, wherein the HARQ feedback size indicates that HARQ feedback is being skipped and wherein a second part of the UCI message does not include HARQ feedback information.

Example 5 comprises the subject matter of example 3, wherein the HARQ feedback size indicates that HARQ feedback is being provided and wherein a second part of the UCI message includes at least a portion of the HARQ feedback information.

Example 6 comprises the subject matter of example 1, further comprising determining not to skip the SPS HARQ transmitting occasion based on the determination that the SPS HARQ transmitting occasion overlaps the first transmitting occasion.

Example 7 comprises the subject matter of example 6, further comprising determining to defer a SPS HARQ feedback transmission to the SPS HARQ transmitting occasion and wherein the SPS HARQ feedback information includes deferred SPS HARQ feedback information.

Example 8 comprises the subject matter of examples 1 and 6, further comprising: determining a transmission resource for the multiplexed SPS HARQ feedback information and the other information based on the second SPS information and identified first transmitting occasion; and transmitting, on an indication channel, an indication of the determined transmission resource.

Example 9 comprises the subject matter of examples 1-5, further comprising: determining a slot for transmitting the multiplexed SPS HARQ feedback information and the other information based on the second SPS information and the identified first transmitting occasion; and transmitting an indication of the SPS HARQ feedback information in the slot.

Example 10 comprises the subject matter of examples 1-6, and 9, wherein the other information comprises a physical uplink shared channel (PUSCH), PUCCH carrying HARQ feedback, scheduling request, or channel state information (CSI) message.

Example 11 comprises the subject matter of examples 1-10, wherein the first transmitting occasion is identified based on transmitting occasion information received from the wireless node.

Example 12 comprises the subject matter of examples 1-5, and 9-11, further comprising: determining to defer a SPS HARQ feedback transmission to the SPS HARQ transmitting occasion, and wherein determining that the SPS HARQ transmitting occasion can be skipped is based on HARQ feedback values of the deferred SPS HARQ transmission.

According to Example 13, a first wireless device comprising: a radio; and a processor operably coupled to the radio, wherein the processor is configured to: receive a first semi-persistent scheduling (SPS) information indicating a set of receiving occasions; receive, by the wireless device, second SPS information for transmitting hybrid automatic repeat request (HARQ) information for the set of receiving occasions; determine a SPS HARQ transmitting occasion based on the received second SPS information; monitor for transmissions to the wireless device during one or more receiving occasions of the set of receiving occasions; determine a HARQ feedback value for the one or more receiving occasions based on the monitoring; determine that the SPS HARQ transmitting occasion can be skipped based on the HARQ feedback value; identify a first transmitting occasion for transmitting other information to the wireless node; determine that the SPS HARQ transmitting occasion overlaps the first transmitting occasion; determine SPS HARQ feedback information based on the determination that the that the SPS HARQ transmitting occasion overlaps the first transmitting occasion; and multiplex the SPS HARQ feedback information and the other information.

Example 14 comprises the subject matter of example 13, wherein the SPS HARQ feedback information and the other information are multiplexed into an uplink control information (UCI) message, the UCI message including two parts.

Example 2 comprises the subject matter of example 14, wherein the SPS HARQ feedback information includes an indication of a HARQ feedback size, and wherein the indication of the HARQ feedback size is included in a first part of the UCI message.

Example 16 comprises the subject matter of example 15, wherein the HARQ feedback size indicates that HARQ feedback is being skipped and wherein a second part of the UCI message does not include HARQ feedback information.

Example 17 comprises the subject matter of example 15, wherein the HARQ feedback size indicates that HARQ feedback is being provided and wherein a second part of the UCI message includes at least a portion of the HARQ feedback information.

Example 18 comprises the subject matter of example 13, wherein the processor is further configured to determine not to skip the SPS HARQ transmitting occasion based on the determination that the SPS HARQ transmitting occasion overlaps the first transmitting occasion.

Example 19 comprises the subject matter of example 18, wherein the processor is further configured to determine to defer a SPS HARQ feedback transmission to the SPS HARQ transmitting occasion and wherein the SPS HARQ feedback information includes deferred SPS HARQ feedback information.

Example 20 comprises the subject matter of examples 13 and 18, wherein the processor is further configured to: determine a transmission resource for the multiplexed SPS HARQ feedback information and the other information based on the second SPS information and identified first transmitting occasion; and transmit, on an indication channel, an indication of the determined transmission resource.

Example 21 comprises the subject matter of examples 13-18, wherein the processor is further configured to: determine a slot for transmitting the multiplexed SPS HARQ feedback information and the other information based on the second SPS information and the identified first transmitting occasion; and transmit an indication of the SPS HARQ feedback information in the slot.

Example 22 comprises the subject matter of examples 13-19, and 21, wherein the other information comprises a physical uplink shared channel (PUSCH), PUCCH carrying HARQ feedback, scheduling request, or channel state information (CSI) message.

Example 23 comprises the subject matter of examples 13-22, wherein the first transmitting occasion is identified based on transmitting occasion information received from the wireless node.

Example 24 comprises the subject matter of examples 13-18, and 21-23, wherein the processor is further configured to: determine to defer a SPS HARQ feedback transmission to the SPS HARQ transmitting occasion, and wherein the processor is further configured to determine that the SPS HARQ transmitting occasion can be skipped based on HARQ feedback values of the deferred SPS HARQ transmission.

According to Example 25, a non-volatile computer-readable medium storing instructions that, when executed, cause a processor to: receive a first semi-persistent scheduling (SPS) information indicating a set of receiving occasions; receive, by the wireless device, second SPS information for transmitting hybrid automatic repeat request (HARQ) information for the set of receiving occasions; determine a SPS HARQ transmitting occasion based on the received second SPS information; monitor for transmissions to the wireless device during one or more receiving occasions of the set of receiving occasions; determine a HARQ feedback value for the one or more receiving occasions based on the monitoring; determine that the SPS HARQ transmitting occasion can be skipped based on the HARQ feedback value; identify a first transmitting occasion for transmitting other information to the wireless node; determine that the SPS HARQ transmitting occasion overlaps the first transmitting occasion; determine SPS HARQ feedback information based on the determination that the that the SPS HARQ transmitting occasion overlaps the first transmitting occasion; and multiplex the SPS HARQ feedback information and the other information.

Example 26 comprises the subject matter of example 25, wherein the SPS HARQ feedback information and the other information are multiplexed into an uplink control information (UCI) message, the UCI message including two parts.

Example 27 comprises the subject matter of example 26, wherein the SPS HARQ feedback information includes an indication of a HARQ feedback size, and wherein the indication of the HARQ feedback size is included in a first part of the UCI message.

Example 28 comprises the subject matter of example 27, wherein the HARQ feedback size indicates that HARQ feedback is being skipped and wherein a second part of the UCI message does not include HARQ feedback information.

Example 29 comprises the subject matter of example 27, wherein the HARQ feedback size indicates that HARQ feedback is being provided and wherein a second part of the UCI message includes at least a portion of the HARQ feedback information.

Example 30 comprises the subject matter of example 25, wherein the processor is further configured to determine not to skip the SPS HARQ transmitting occasion based on the determination that the SPS HARQ transmitting occasion overlaps the first transmitting occasion.

Example 31 comprises the subject matter of example 30, wherein the processor is further configured to determine to defer a SPS HARQ feedback transmission to the SPS HARQ transmitting occasion and wherein the SPS HARQ feedback information includes deferred SPS HARQ feedback information.

Example 32 comprises the subject matter of examples 25 and 30, wherein the processor is further configured to: determine a transmission resource for the multiplexed SPS HARQ feedback information and the other information based on the second SPS information and identified first transmitting occasion; and transmit, on an indication channel, an indication of the determined transmission resource.

Example 33 comprises the subject matter of examples 25-30, wherein the processor is further configured to: determine a slot for transmitting the multiplexed SPS HARQ feedback information and the other information based on the second SPS information and the identified first transmitting occasion; and transmit an indication of the SPS HARQ feedback information in the slot.

Example 34 comprises the subject matter of examples 25-31, and 33, wherein the other information comprises a physical uplink shared channel (PUSCH), PUCCH carrying HARQ feedback, scheduling request, or channel state information (CSI) message.

Example 35 comprises the subject matter of examples 25-34, wherein the first transmitting occasion is identified based on transmitting occasion information received from the wireless node.

Example 36 comprises the subject matter of examples 25-30, and 33-35, wherein the processor is further configured to: determine to defer a SPS HARQ feedback transmission to the SPS HARQ transmitting occasion, and wherein the processor is further configured to determine that the SPS HARQ transmitting occasion can be skipped based on HARQ feedback values of the deferred SPS HARQ transmission.

According to Example 37, a method that includes any action or combination of actions as substantially described herein in the Detailed Description.

According to Example 38, a method as substantially described herein with reference to each or any combination of the Figures included herein or with reference to each or any combination of paragraphs in the Detailed Description.

According to Example 39, a wireless device configured to perform any action or combination of actions as substantially described herein in the Detailed Description as included in the wireless device.

According to Example 40, a wireless station configured to perform any action or combination of actions as substantially described herein in the Detailed Description as included in the wireless station.

According to Example 41, a non-volatile computer-readable medium that stores instructions that, when executed, cause the performance of any action or combination of actions as substantially described herein in the Detailed Description.

According to Example 42, an integrated circuit configured to perform any action or combination of actions as substantially described herein in the Detailed Description.

Yet another exemplary embodiment may include a method, comprising: by a device: performing any or all parts of the preceding examples.

A yet further exemplary embodiment may include a non-transitory computer-accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a wireless device, comprising:
receiving first semi-persistent scheduling (SPS) information indicating a set of receiving occasions and second SPS information for transmitting hybrid automatic repeat request (HARQ) information for the set of receiving occasions;
determining a SPS HARQ transmitting occasion based on the received second SPS information;
determining that the SPS HARQ transmitting occasion can be skipped based on a HARQ feedback value for one or more receiving occasions of the set of receiving occasions;
identifying a first transmitting occasion for transmitting other information to a wireless node;
determining that the SPS HARQ transmitting occasion overlaps the first transmitting occasion;
determining SPS HARQ feedback information based on the determination that the SPS HARQ transmitting occasion overlaps the first transmitting occasion;
multiplexing the SPS HARQ feedback information and the other information; and
transmitting the multiplexed SPS HARQ feedback information and other information to the wireless node.

2. The method of claim 1, wherein the SPS HARQ feedback information and the other information are multiplexed into an uplink control information (UCI) message, the UCI message including two parts, wherein the SPS HARQ feedback information includes an indication of a HARQ feedback size, and wherein the indication of the HARQ feedback size is included in a first part of the UCI message.

3. The method of claim 2, wherein the HARQ feedback size indicates that HARQ feedback is being skipped, and wherein a second part of the UCI message does not include HARQ feedback information.

4. The method of claim 2, wherein the HARQ feedback size indicates that HARQ feedback is being provided, and wherein a second part of the UCI message includes at least a portion of the HARQ feedback information.

5. The method of claim 1, further comprising:
determining a transmission resource for the multiplexed SPS HARQ feedback information and the other information based on the second SPS information and the identified first transmitting occasion; and
transmitting, on an indication channel, an indication of the determined transmission resource.

6. The method of claim 1, further comprising:
determining a slot for transmitting the multiplexed SPS HARQ feedback information and the other information based on the second SPS information and the identified first transmitting occasion; and
transmitting an indication of the SPS HARQ feedback information in the slot.

7. The method of claim 1, further comprising:
determining to defer a SPS HARQ feedback transmission to the SPS HARQ transmitting occasion, and wherein determining that the SPS HARQ transmitting occasion can be skipped is based on HARQ feedback values of the deferred SPS HARQ transmission.

8. A first wireless device comprising:
a radio; and
a processor operably coupled to the radio, wherein the processor is configured to cause the wireless device to:
receive a first semi-persistent scheduling (SPS) information indicating a set of receiving occasions and second SPS information for transmitting hybrid automatic repeat request (HARQ) information for the set of receiving occasions;
determine a SPS HARQ transmitting occasion based on the received second SPS information;
determine that the SPS HARQ transmitting occasion can be skipped based on a HARQ feedback value for one or more receiving occasions of the set of receiving occasions;
identify a first transmitting occasion for transmitting other information to a wireless node;
determine that the SPS HARQ transmitting occasion overlaps the first transmitting occasion;
determine SPS HARQ feedback information based on the determination that the SPS HARQ transmitting occasion overlaps the first transmitting occasion;
multiplex the SPS HARQ feedback information and the other information; and
transmitting the multiplexed SPS HARQ feedback information and other information to the wireless node.

9. The wireless device of claim 8, wherein the SPS HARQ feedback information and the other information are multiplexed into an uplink control information (UCI) message, the UCI message including two parts, wherein the SPS HARQ feedback information includes an indication of a HARQ feedback size, and wherein the indication of the HARQ feedback size is included in a first part of the UCI message.

10. The wireless device of claim 9, wherein the HARQ feedback size indicates that HARQ feedback is being skipped, and wherein a second part of the UCI message does not include HARQ feedback information.

11. The wireless device of claim 9, wherein the HARQ feedback size indicates that HARQ feedback is being provided, and wherein a second part of the UCI message includes at least a portion of the HARQ feedback information.

12. The wireless device of claim 8, wherein the processor is further configured to cause the wireless device to determine not to skip the SPS HARQ transmitting occasion based on the determination that the SPS HARQ transmitting occasion overlaps the first transmitting occasion.

13. The wireless device of claim 8, wherein the processor is further configured to cause the wireless device to:
determine a transmission resource for the multiplexed SPS HARQ feedback information and the other information based on the second SPS information and the identified first transmitting occasion; and
transmit, on an indication channel, an indication of the determined transmission resource.

14. The wireless device of claim 8, wherein the processor is further configured to cause the wireless device to:
determine a slot for transmitting the multiplexed SPS HARQ feedback information and the other information based on the second SPS information and the identified first transmitting occasion; and
transmit an indication of the SPS HARQ feedback information in the slot.

15. The wireless device of claim 8, wherein the processor is further configured to cause the wireless device to:
determine to defer a SPS HARQ feedback transmission to the SPS HARQ transmitting occasion, and wherein the processor is further configured to cause the wireless device to determine that the SPS HARQ transmitting occasion can be skipped based on HARQ feedback values of the deferred SPS HARQ transmission.

16. A non-volatile computer-readable medium storing instructions that, when executed by a processor, cause a wireless device to:
receive a first semi-persistent scheduling (SPS) information indicating a set of receiving occasions and second SPS information for transmitting hybrid automatic repeat request (HARQ) information for the set of receiving occasions;
determine a SPS HARQ transmitting occasion based on the received second SPS information;
determine that the SPS HARQ transmitting occasion can be skipped based on a HARQ feedback value for one or more receiving occasions of the set of receiving occasions;
identify a first transmitting occasion for transmitting other information to a wireless node;
determine that the SPS HARQ transmitting occasion overlaps the first transmitting occasion;
determine SPS HARQ feedback information based on the determination that the SPS HARQ transmitting occasion overlaps the first transmitting occasion;
multiplex the SPS HARQ feedback information and the other information; and
transmitting the multiplexed SPS HARQ feedback information and other information to the wireless node.

17. The non-volatile computer-readable medium of claim 16, wherein the SPS HARQ feedback information and the other information are multiplexed into an uplink control information (UCI) message, the UCI message including two parts, and wherein the SPS HARQ feedback information includes an indication of a HARQ feedback size, wherein the indication of the HARQ feedback size is included in a first part of the UCI message, wherein the HARQ feedback size indicates that HARQ feedback is being skipped, and wherein a second part of the UCI message does not include HARQ feedback information.

18. The non-volatile computer-readable medium of claim 17, wherein the HARQ feedback size indicates that HARQ feedback is being provided, and wherein a second part of the UCI message includes at least a portion of the HARQ feedback information.

19. The non-volatile computer-readable medium of claim 16, wherein the instructions further cause the wireless device to determine not to skip the SPS HARQ transmitting occasion based on the determination that the SPS HARQ transmitting occasion overlaps the first transmitting occasion.

20. The non-volatile computer-readable medium of claim 19, wherein the instructions further cause the wireless device to determine to defer a SPS HARQ feedback transmission to the SPS HARQ transmitting occasion, and wherein the SPS HARQ feedback information includes deferred SPS HARQ feedback information.

\* \* \* \* \*